Figure 1:
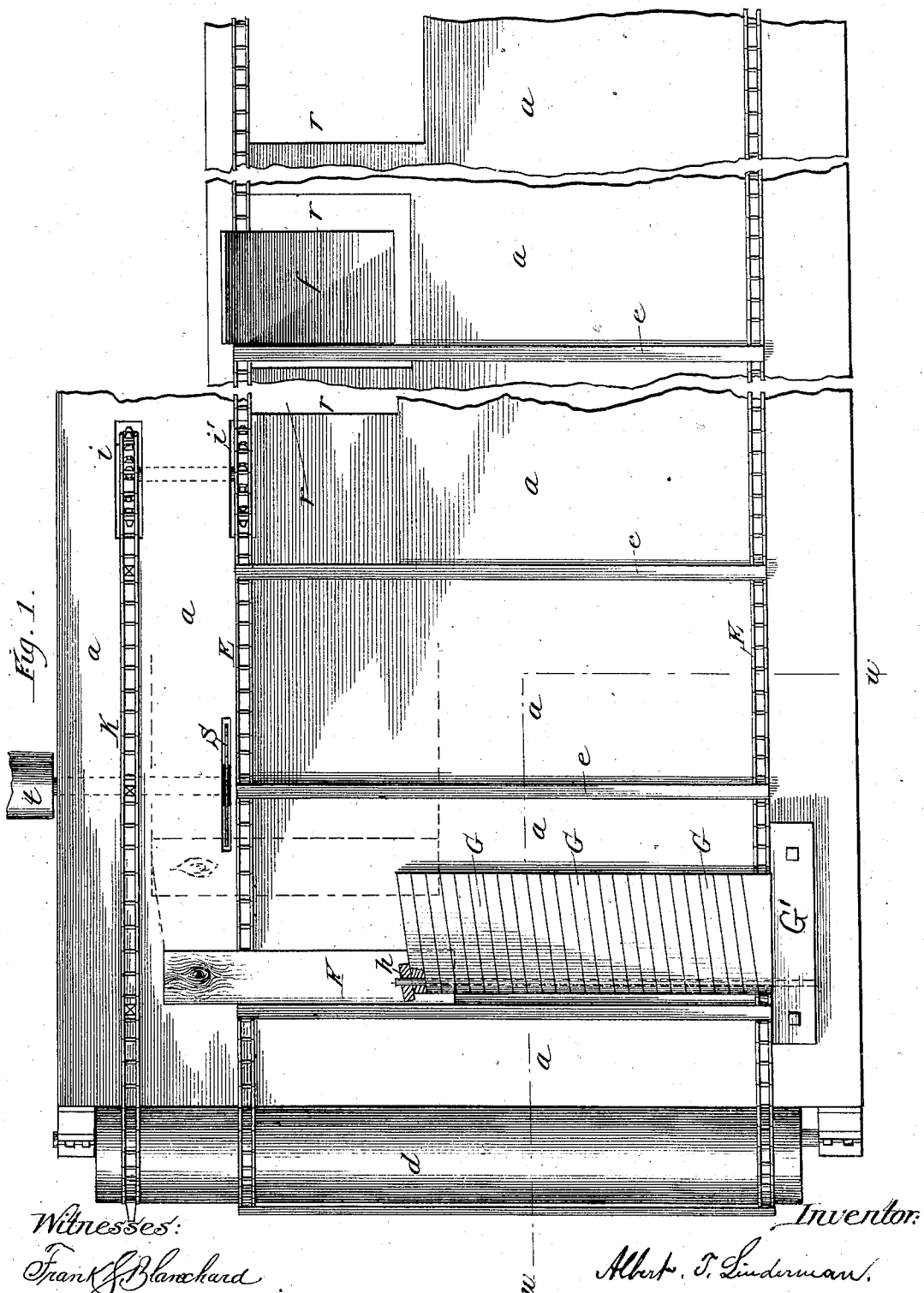

(No Model.)  2 Sheets—Sheet 1.

A. T. LINDERMAN.
LUMBER TRIMMING AND ASSORTING MACHINE.

No. 378,796. Patented Feb. 28, 1888.

Witnesses:
Frank J. Blanchard
Felix J. Griffen

Inventor:
Albert T. Linderman (No Model.) 2 Sheets—Sheet 2.
A. T. LINDERMAN.
LUMBER TRIMMING AND ASSORTING MACHINE.
No. 378,796. Patented Feb. 28, 1888.
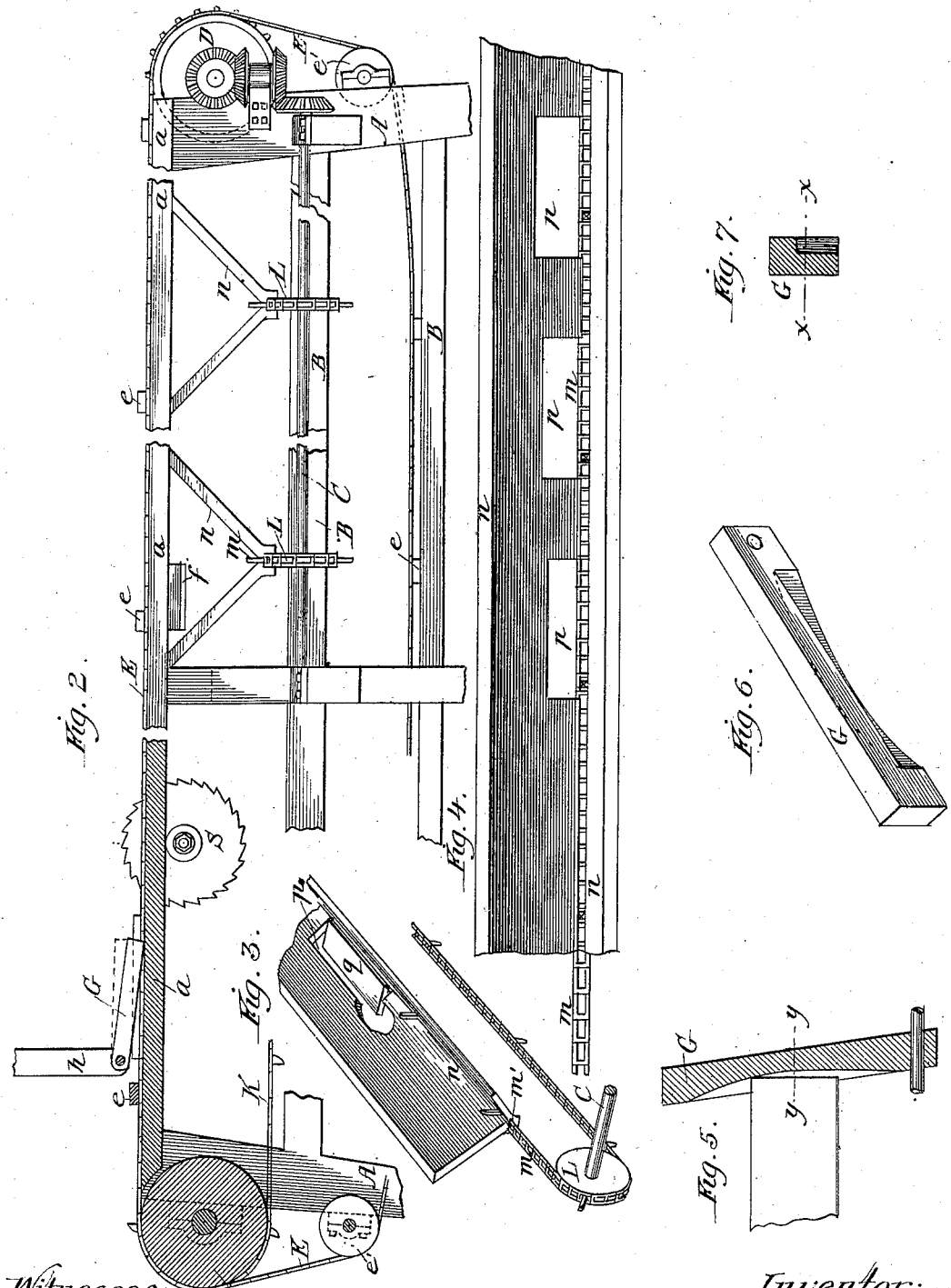
Witnesses:
Frank J. Blanchard
Felix J. Griffen
Inventor:
Albert T. Linderman

UNITED STATES PATENT OFFICE.

ALBERT T. LINDERMAN, OF WHITEHALL, MICHIGAN, ASSIGNOR TO ELLA A. LINDERMAN, OF SAME PLACE.

LUMBER TRIMMING AND ASSORTING MACHINE.

SPECIFICATION forming part of Letters Patent No. 378,796, dated February 28, 1888.

Application filed March 6, 1886. Serial No. 194,328. (No model.)

*To all whom it may concern:*

Be it known that I, ALBERT T. LINDERMAN, a citizen of the United States, residing at Whitehall, in the county of Muskegon and State of Michigan, have invented a new and useful Lumber Trimming and Assorting Machine, of which the following is a specification.

My invention relates to improvements in machines for trimming off the ends or defects from lumber; and the objects of my invention are to provide a machine which will operate so as to do this and at the same time assort the trimmed lumber according to its length and width. I attain these objects by the mechanism illustrated in the accompanying drawings, in which—

Figure 1 is a plan view of that part of the machine which first receives the lumber to be trimmed, broken sections of the conveyer-table, with length-assorting orifices of different and graduated size, being shown. Fig. 2 is a broken side view of the machine, showing the position of the width-assorting troughs under the length-assorting conveyer and the manner of driving the endless-chain conveyers of both. Fig. 3 is a broken perspective view of a width-assorting trough as it would appear detached from the machine, the better to show its parts. Fig. 4 is a broken plan view of the same, showing several graduated width-assorting openings. Fig. 5 is a sectional view, drawn at the plane X X, Fig. 7, of a gage-key. Fig. 6 is a perspective view of a gage-key, a series of which are used in the machine to engage the different lengths of lumber trimmed, and, by sliding the lumber endwise as it passes under them before it reaches the saw, regulate the length to which the lumber is cut off. Fig. 7 is a sectional view of a gage-key, drawn at the plane Y Y, Fig. 5.

Similar letters indicate like parts throughout the several views.

The legs A A, table *a a*, &c., and girders B B, constitute the frame-work of the machine. The shaft C, being turned by the application of a suitable power, revolves by means of the bevel gear-wheels the shaft on which are keyed the driving sprocket-wheels D. These sprocket-wheels draw the endless chains E E, and, being united by the slats *e e*, constitute a double-strand conveyer that moves the lumber. The sprocket-wheels L L are also turned by the shaft C. These sprocket-wheels move the endless conveyer-chain *m*, which conveys the lumber lengthwise when it falls into the width-assorting troughs. The pulley-wheel *t*, turned by suitable belt or power, turns the spindle to which the saw S is hung. The roller *d* is supported by gudgeons in each end, which turn in bearings on the legs A A. Similar rollers, *e' e'*, serve to keep the conveyer-chain from contact with the length-sorting troughs. The conveyer-chain *m*, provided with lugs for moving the boards, travels in the groove *m'* in the bottom of the trough *n*, and is driven by the sprocket-wheel L, and is served by a similar idler sprocket-wheel (not shown) at the outer end of the trough *n*. The gage-keys G G are provided with a hole in their ends. Through this hole passes the iron rod which supports them, the rod being held by the block G' at one end and by the hanger *h* at the other. This supporting-rod should be high enough above the table to allow the lumber to pass freely under the gage-keys which it supports. The other end of the gage-keys rests upon the table *a*. The end of the gage-key which rests upon the table should be the thickness of the key nearer to a line drawn parallel with the saw—the line running from the saw to the roller *d*—than the end of the key that is supported by the iron rod, the gage-key *g* being enough thicker at the lower end to maintain all the keys at this angle, the office which these keys perform being to bear against the end of the lumber passing underneath or within the radius of any one of them, and as it passes along their length to slide it endwise toward the saw until the end of the gage-key is reached. The lumber then maintains its position on the conveyer-bar until it is sawed off and is cut some regulated length. Thus if the gage-keys be two inches thick the lumber will vary in length two inches or some multiple of two inches. If the gage-keys are a foot thick, then the lumber will vary in length a foot or multiple of a foot.

A piece of lumber, F, Fig. 1, is shown as having a defect to be trimmed off as it is carried under the gage-keys by the conveyer toward the saw, its changed position, caused by the gage-key as it passes under the key, being shown by the dotted outlines of the board. The openings r r r in the table a are made to allow the different lengths of lumber to drop through. The first opening, or the one nearest the saw, is made slightly wider than the distance of the nearest gage-key to the saw is from a line drawn from the saw-teeth and parallel with the conveyer-chain, this latter distance representing the shortest length of lumber cut. The first opening r will allow it to drop through. The next opening should be the width of the gage-keys longer than the first, which will allow the second length to fall through, and so on until as many openings, graduated in increased length, are made in the conveyer-table as there are keys. The girders B B are fastened to and allowed to project from the inside of the legs A A, thus forming a slide to carry the conveyer-chain in its return.

The gage-keys G G, &c., are preferably cut out upon the under edge, as shown in Fig. 6, as I find that this form more surely engages the ends of the lumber, as shown in Fig. 5. The edges of the table a are recessed for the conveyer-chain to travel in, so that the under side of the cross-bars rest upon the table-top. The width-assorting troughs n n are attached to the under side of the table a at each of the openings in the table a through which the lumber falls. These troughs are provided with grooves m', in which the conveyer-chain m travels. This chain should be furnished with lugs to move the lumber along the trough when it falls into the trough. The trough n is provided with apertures p on one or both sides for the lumber to fall through. As the design of these openings is to assort the lumber which passes them in width, the narrowest opening p should be next to where the lumber falls into the trough n from the conveyer, graduating the increase of the width of the other openings according as it is desired to assort the lumber in width.

To operate the machine, the stock F is laid upon the table a near the roller d, with the point near which it is desired to trim it off about in line with the saw S. The conveyer-bars carry it along under the gage-keys, which regulate its length. It is then cut or trimmed by the saw, and, passing along the conveyer, reaches an opening in the table sufficiently large to allow it to drop through into the width-assorting trough. It is then carried along this trough by the conveyer-chain, which runs in the bottom of the trough, until it reaches an opening in the side of the trough wide enough to allow it to fall through, when it is at its proper place upon the yard, assorted according to its length and width.

Heretofore lumber-trimmings have not been utilized to any great extent on account of the expense of cutting out the good lumber that was in them and assorting it after it was cut, one to two cords being a good day's work for a man, besides a boy to assort them. By the use of my improved machine a man will cut and sort forty to fifty cords in a day, besides the stock will be better assorted, as each length and each different width of each length will be by itself.

What I claim as my invention, and desire to secure by Letters Patent, is—

1. In a machine for trimming lumber, the series of gage-keys G G, &c., severally, one end of each of which is pivotally hung above the passing lumber, the other end falling obliquely toward the saw, whereby the end of the passing lumber contacts with one of the keys and is adjusted to a definite position as it passes onto the saw, substantially as shown and described.

2. A lumber trimming and assorting machine having a conveyer mechanism for moving the lumber along a supporting-table, a saw for trimming the lumber during its transit, and graduated openings, the smallest opening being nearest the saw, in the supporting-table of the conveyer, through some of which openings the trimmed lumber falls, whereby it is assorted according to its length, substantially as shown and described.

3. In lumber-assorting machines, a conveyer having an inclined bottom to hold by gravity the lower edge of the passing lumber against the lower side board of the conveyer, an endless conveying mechanism traveling in a recess in the bottom of the conveyer for moving the lumber along the conveyer, and graduated openings in the inclined bottom of the conveyer, the smallest opening being next the point of entry of the lumber to the conveyer, for allowing the lumber to drop through or out of the conveyer when the lumber reaches an opening sufficiently wide, whereby the passing lumber is assorted and dropped at different points along the conveyer, according to its width, substantially as shown and described.

4. A lumber trimming and assorting machine having the following elements: an endless-chain conveyer for carrying the lumber sidewise along the conveyer-table, gage-keys for regulating the position of the lumber on the conveyer-table, a saw for cutting off the lumber in transit, graduated openings in the conveyer-table through which the lumber drops according to its length, thereby being assorted as to length, a conveyer-trough underneath these openings into which the lumber falls, and graduated openings in the inclined bottom of this trough through which the lumber in passing falls, thereby assorting the lumber as to width, substantially as shown and described.

ALBERT T. LINDERMAN.

Witnesses:
 M. A. GRANT,
 FELIX J. GRIFFEN.